Oct. 27, 1959    R. D. DODGE    2,909,935

DRIVE MECHANISM

Filed Jan. 6, 1958

INVENTOR.
RONALD D. DODGE

BY *Ralph C. Dustin*

ATTORNEY

United States Patent Office 2,909,935
Patented Oct. 27, 1959

2,909,935

DRIVE MECHANISM

Ronald D. Dodge, Lexington, Ky., assignor to International Business Machines Corporation, New York, N.Y., a corporation of New York Application January 6, 1958, Serial No. 707,427

6 Claims. (Cl. 74—27)

This invention relates to drive mechanisms, and more particularly to drive mechanisms controlled by spring clutches and effecting reciprocation of a driven member.

In a patent application to Neil D. Walton et al. Serial No. 705,978, filed concurrently herewith, there is shown a power driving mechanism for returning a typewriter carriage from a point at which typing takes place in one line to a point for typing at the beginning of another line. Included in this driving mechanism is a clutch which may be applied for moving the carriage in one direction against the action of a spring tending to move it in the opposite direction. When this clutch is disengaged and the carriage is free for movement, the spring moves the carriage under the control of a second clutch so as to prevent movement at excessive speeds. This application is directed to the clutch mechanisms controlling the movement of the carriage. It will be appreciated that the clutch mechanisms may be employed for controlling movement of any reciprocable member other than a typewriter carriage, if desired.

An object of this invention is to provide an improved clutch mechanism.

Another object is to provide an improved clutch mechanism which operates automatically to prevent movement of a member at excessive speeds.

Yet another object is to provide in a drive mechanism for a driven member a pair of clutches, one operable for connecting a driving member to the driven member to move it in one direction, and the other operable for connecting the driven member to the driving member to prevent movement of the driven member in the opposite direction at excessive speeds under the action of a yieldable driving means.

Other objects of the invention will be pointed out in the following description and claims and illustrated in the accompanying drawings, which disclose, by way of example, the principle of the invention and the best mode, which has been contemplated, of applying that principle.

Figure 1:
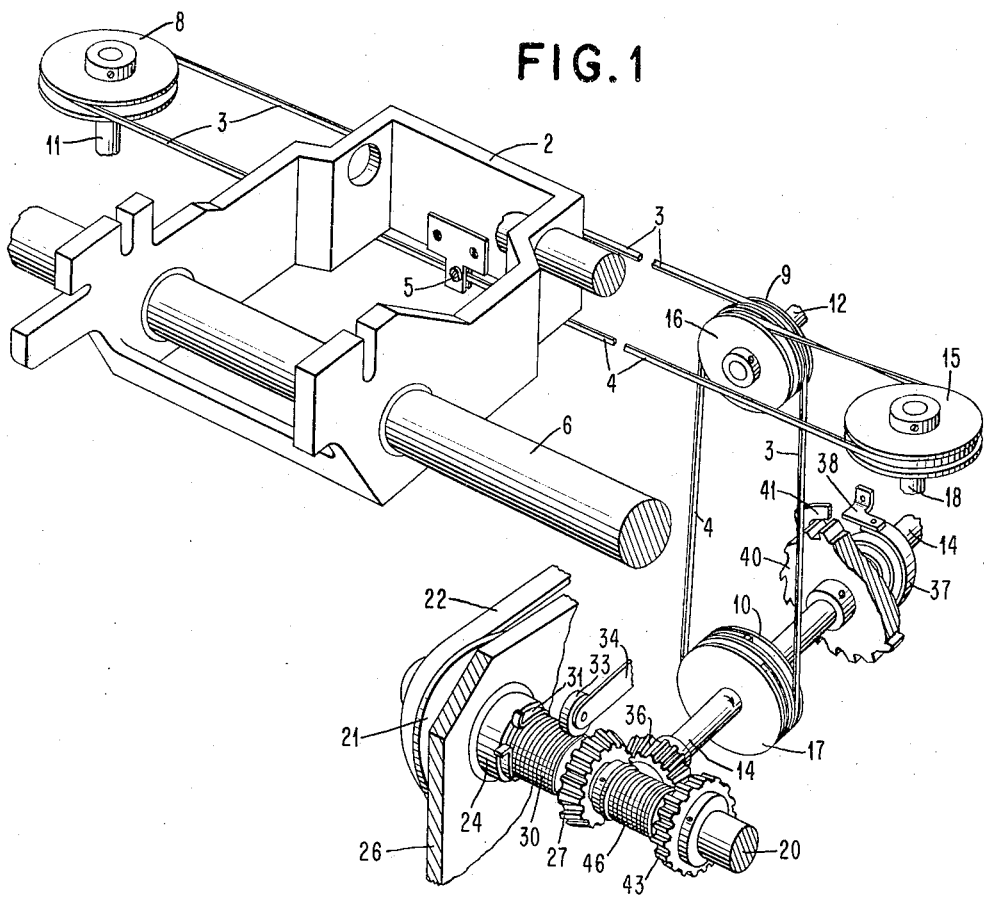
Fig. 1 is a perspective view of the improved drive mechanism operating to control movement of a reciprocable member.
Figure 2:
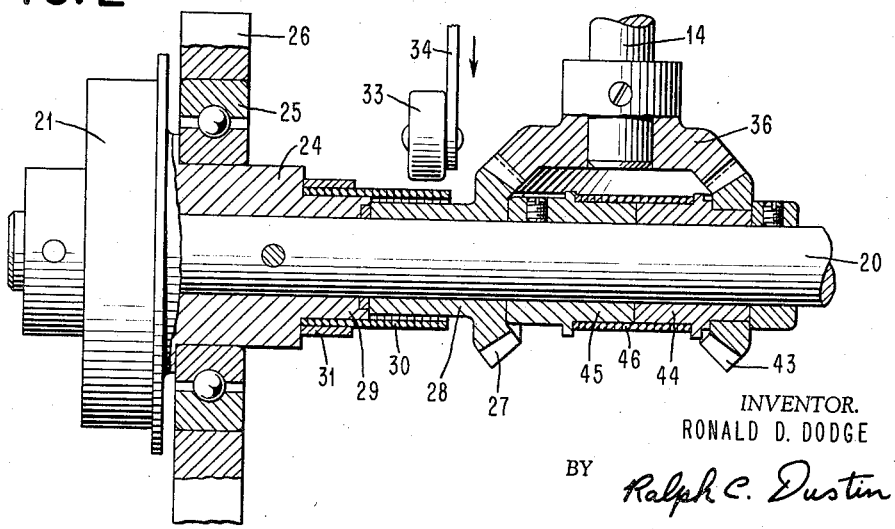
Fig. 2 is an enlarged horizontal sectional view of the clutch controlled drive mechanism shown in Fig. 1.

Referring to the drawings it will be noted that there is shown in Fig. 1 a carriage 2 like that in the Walton et al. application referred to above. This carriage is designed to carry a typehead as shown in a patent application by L. E. Palmer, Serial No. 653,806, filed April 19, 1957. Tapes or wires 3 and 4 are connected to the carriage by a screw 5 and may be operated to slide the carriage in one direction or the other along a shaft 6. The tape 3 passes around pulleys 8 and 9 to a pulley 10 to which it is connected by any suitable means. Pulleys 8 and 9 are rotatably supported by fixed pins 11 and 12 while pulley 10 is fixed to a rotatable shaft 14. The tape 4 passes around pulleys 15 and 16 to a pulley 17 to which it is connected. Pulley 15 is rotatably supported by a fixed pin 18 while the pulley 16 is rotatably supported by the pin 12 and the pulley 17 is fixed to the shaft 14. The arrangement of tapes and pulleys is such that a rotation of the shaft 14 in a clockwise direction results in a movement of the carriage to the left, and a rotation of the shaft in a counter-clockwise direction causes the carriage to move to the right.

Arranged perpendicular to the shaft 14 is a drive shaft 20 having a pulley 21 fixed to one of its ends. Engaging the pulley 21 is a belt 22 which is driven by a power means, not shown, at a constant speed in a clockwise direction looking from left to right. Formed integral with the pulley 21 is a hub portion 24 supported in a bearing 25 carried by a supporting plate 26. Freely mounted upon the shaft 20 is a bevel gear 27 having a hub 28 which is slightly smaller in outside diameter than a reduced hub portion 29 on the pulley. Surrounding the hub portion 29 and the gear hub 28 is a coiled spring 30 which is wrapped, extending from left to right, in a direction opposite to the rotation of the shaft 20. The left end of the spring 30 is clamped to the hub portion 29 by a C-shaped spring member 31. Due to the slight difference in diameter between the hub 28 and the hub portion 29, a clearance is provided between the spring 30 and the hub 28 so that the gear 27 may normally turn freely on the shaft 20. Arranged adjacent the right end of the spring 30 is a roller 33 carried by an arm 34 which may be actuated manually to engage the roller with the spring for deflecting the latter into engagement with the hub 28. Friction between the spring and the hub 28 causes the spring to wrap itself tightly about the hubs 28 and 29 and connect the gear 27 to the shaft 20. If desired, a shoe may be used in place of the roller 33 so as to provide a friction between the shoe and the spring 30 adding to the friction between the spring and the gear hub for operating the spring to effect a driving of the gear.

Fixed to the shaft 14 is a bevel gear 36 meshing with the gear 27. At the rear end of the shaft 14 is a clock spring 37 which is fixed at its inner end to the shaft 14 and is fixed at its outer end to a stationary member 38, as shown in Fig. 1. The arrangement of this spring is such that it tends to rotate the shaft 14 in a counter-clockwise direction. Fixed to the shaft 14 is a ratchet wheel 40 normally engaged by a pawl 41 for holding the shaft against rotation by the spring 37. The pawl may be disengaged from the ratchet wheel by manually actuated means, not shown, to permit rotation of the shaft by the spring 37 if the spring clutch 30 is also disengaged.

Upon deflecting the spring 30 into engagement with the hub of the gear 27, the shaft 14 is rotated in a clockwise direction to move the carriage to the left and, at the same time, effect a winding of the spring 37. The pawl 41 may, if desired, be removed from the ratchet wheel 37 during this time. After movement of the carriage to the left has been completed, the pawl 41 is engaged with the ratchet wheel to hold the carriage against movement to the right by the spring. When movement of the carriage to the right is desired, the pawl is disengaged from the ratchet wheel to permit rotation of the shaft 14 by the spring 37.

If the carriage is permitted to move a substantial distance to the right without interruption, the speed may become excessive if no regulating means is provided. For limiting the speed of the carriage to the right, there is provided a bevel gear 43 freely mounted on the shaft 20 and meshing with the gear 36. Formed upon the gear 43 is a hub 44 having substantially the same outside diameter as a sleeve-shaped member 45 fixed to the shaft 20 adjacent the hub. Surrounding the member 45 and the hub 44 is a coiled spring 46 which is wrapped, extending from left to right, in the same direction as the rotation of the shaft 20. The spring 46 is coiled so as to have frictional engagement with the member 45 and the hub 44.

It will be appreciated that a rotation of the gear 43 either in a direction opposite to the shaft or in the same direction but at a slower speed, will result in an expanding of the spring 46 to permit free rotation of the gear. If the gear is driven in the same direction as the shaft and its speed tends to exceed that of the shaft, then the spring 46 winds tightly on the hub 44 and the member 45 to limit the speed of the gear to that of the shaft. Movement of the carriage to the right under the action of the spring 37 is, therefore, limited to the speed which is permitted by the rotation of the shaft 20, this being the same shaft employed for driving the carriage to the left.

It will be understood that the carriage is shown only as an example of a device which is moved in opposite directions. Connections could just as well be made to the shaft 14 to effect rotary motion or some other type of motion to a device to be driven.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A clutch controlled drive mechanism for a member to be driven in one direction or another comprising, in combination, a first shaft, means for rotating said shaft continuously in one direction, a second shaft, means including a clutch mechanism operable to connect said first shaft in driving relation with said second shaft, yieldable means tending to rotate said second shaft in a direction opposite to that in which it is driven by said first shaft, means releasably holding said second shaft against rotation by said yieldable means, said yieldable means operating upon a release of said holding means and a disengagement of said clutch mechanism for rotating said second shaft, means including a second clutch mechanism operating at a predetermined speed of said second shaft by said yieldable means for connecting said first shaft to said second shaft to limit the speed of the latter, and means for connecting said second shaft in driving relation with said member to be driven.

2. The mechanism of claim 1 in which said means connecting said first shaft to said second shaft for limiting its speed comprises a first gear freely mounted upon said first shaft, a second gear fixed to said second shaft and meshing with said first gear, and a coiled spring frictionally connecting said first gear to said first shaft, said coiled spring operating to lock said first gear to said first shaft when they rotate in the same direction at equal speeds.

3. A clutch controlled drive mechanism for a member to be driven in one direction or another comprising, in combination, a first shaft, means for rotating said shaft continuously in one direction, a second shaft, a first gear freely mounted upon said first shaft, a second gear fixed to said second shaft and meshing with said first gear, a manually controlled clutch for connecting said first gear to said first shaft to effect a driving of said second shaft, yieldable means operable to rotate said second shaft in a direction opposite to that in which it is driven by said first shaft when said clutch is released, a third gear freely mounted upon said first shaft and meshing with said second gear, said third gear rotating in a direction opposite to said first gear, means including a second clutch operating at a predetermined speed of said second shaft by said yieldable means for connecting said first shaft to said third gear to limit its speed, and means for connecting said second shaft in driving relation with said member to be driven.

4. The drive mechanism of claim 3 in which said manually controlled clutch comprises a spring coiled about said first shaft and a portion of said first gear in a such direction that closer coiling of said spring takes place upon frictionally engaging said first gear, means for clamping one end of said spring to said first shaft, and means for moving the opposite end of said spring into frictional engagement with said first gear.

5. The drive mechanism of claim 3 in which said second clutch comprises a spring frictionally connected to said first shaft and to said third gear, said spring being coiled, extending from said first shaft toward said third gear, in the direction of shaft rotation.

6. A clutch controlled drive mechanism for a member to be driven comprising, in combination, a first rotatable shaft, means for yieldingly rotating said first shaft, a second rotatable shaft, means for rotating said second shaft at a constant speed, a first gear fixed to said first shaft, a second gear freely mounted upon said second shaft and meshing with said first gear, means including a coiled spring operating to lock said second gear to said second shaft when they rotate in the same direction at equal speeds, and means for connecting said first shaft to said member to be driven.

References Cited in the file of this patent

UNITED STATES PATENTS

| | | |
|---|---|---|
| 1,911,536 | Sunstrand | May 30, 1933 |
| 2,236,608 | Pitman | Apr. 1, 1941 |
| 2,300,616 | Crosman | Nov. 3, 1942 |